US009294455B2

(12) United States Patent
Nassar et al.

(10) Patent No.: US 9,294,455 B2
(45) Date of Patent: Mar. 22, 2016

(54) MAINTAINING VIDEO CONFERENCE SESSION CONTINUITY DURING TRANSFER OF SESSION TO ALTERNATIVE DEVICE

(71) Applicant: Google Inc., Mountain View, CA (US)

(72) Inventors: Kareem Aladdin Nassar, Santa Clara, CA (US); Shrikrishna Vijaykumar Borde, Redmond, WA (US); Justin Mattson, San Francisco, CA (US)

(73) Assignee: Google Inc., Mountain View, CA (US)

( * ) Notice: Subject to any disclaimer, the term of this patent is extended or adjusted under 35 U.S.C. 154(b) by 175 days.

(21) Appl. No.: 13/909,794

(22) Filed: Jun. 4, 2013

(65) Prior Publication Data

US 2014/0359709 A1    Dec. 4, 2014

(51) Int. Cl.
*G06F 7/04*       (2006.01)
*G06F 15/16*      (2006.01)
(Continued)

(52) U.S. Cl.
CPC ............ *H04L 63/08* (2013.01); *H04L 65/1083* (2013.01); *H04L 65/403* (2013.01); *H04L 67/148* (2013.01); *H04L 67/02* (2013.01); *H04L 67/04* (2013.01); *H04L 67/14* (2013.01)

(58) Field of Classification Search
CPC ....... H04L 63/08; H04L 67/14; H04L 67/148; H04L 67/02; H04L 67/04; G06F 21/30; G06F 21/305; G06F 21/31; G06F 21/35; G06F 21/44
USPC ........................................................ 726/3–9
See application file for complete search history.

(56) References Cited

U.S. PATENT DOCUMENTS 6,529,941 B2 *   3/2003   Haley ................. H04L 12/1822
                                                               709/204
6,798,755 B2 *   9/2004   Lillie ................. H04L 12/1822
                                                               370/270
(Continued)

FOREIGN PATENT DOCUMENTS

EP            2369806 A1     9/2011
EP            2506535 A1    10/2012
WO         2007118250 A2    10/2007

OTHER PUBLICATIONS

European Patent Office, International Search Report and the Written Opinion in International Patent Application PCT/US2014/040924 (Oct. 9, 2014).
(Continued)

*Primary Examiner* — Jayesh Jhaveri
(74) *Attorney, Agent, or Firm* — Shumaker & Sieffert, P.A.

(57) ABSTRACT

Implementations of the present disclosure provide systems and methods for seamlessly transferring a communication session from a first client to a second client via a close-range communication connection. Implementations contemplate serializing a set of unique identifiers pertaining to a communication session and transmitting the set of serialized identifiers from the first client to the second client via a close-range communication connection. The second client de-serializes the set of unique identifiers and transmits a request to a communication session server to assume control of the communication session from the first client. A communication session server may perform an authentication of the second client that requires the second client to provide credentials associated with a user account. In some implementations, the present disclosure provides for the creation of a temporary use token that enables a client to temporarily acquire credentials associated with a user account.

20 Claims, 8 Drawing Sheets

(51) Int. Cl.
*G06F 17/30* (2006.01)
*H04L 29/06* (2006.01)
*H04L 29/08* (2006.01)

(56) References Cited

U.S. PATENT DOCUMENTS

| | | | |
|---|---|---|---|
| 6,950,862 B1 * | 9/2005 | Puthiyandyil | H04L 67/14 370/331 |
| 7,295,118 B2 | 11/2007 | Jessup et al. | |
| 7,957,518 B2 | 6/2011 | Erb | |
| 8,244,179 B2 | 8/2012 | Dua | |
| 8,370,429 B2 | 2/2013 | Odell et al. | |
| 8,374,172 B2 | 2/2013 | Jana et al. | |
| 8,490,165 B2 * | 7/2013 | Wray | 726/6 |
| 8,515,407 B1 | 8/2013 | Mok et al. | |
| 8,639,230 B2 | 1/2014 | Williams et al. | |
| 8,800,007 B1 * | 8/2014 | Rajagopalan | 726/5 |
| 2002/0068575 A1 | 6/2002 | Agrawal et al. | |
| 2003/0086390 A1 * | 5/2003 | Eschbach | H04L 63/0428 370/329 |
| 2006/0080453 A1 | 4/2006 | Thukral | |
| 2006/0223511 A1 | 10/2006 | Hagale et al. | |
| 2007/0234048 A1 | 10/2007 | Ziv | |
| 2008/0292074 A1 | 11/2008 | Boni et al. | |
| 2011/0065384 A1 | 3/2011 | Cader et al. | |
| 2011/0070828 A1 | 3/2011 | Griffin et al. | |
| 2011/0122864 A1 | 5/2011 | Cherifi et al. | |
| 2011/0177818 A1 | 7/2011 | Heit et al. | |
| 2011/0196973 A1 | 8/2011 | Shaheen et al. | |
| 2012/0265679 A1 * | 10/2012 | Calman et al. | 705/43 |
| 2013/0212286 A1 * | 8/2013 | Krishnakumar | H04L 67/148 709/227 |
| 2013/0318249 A1 * | 11/2013 | McDonough et al. | 709/228 |
| 2014/0122730 A1 * | 5/2014 | Burch et al. | 709/228 |

OTHER PUBLICATIONS

Prosecution History from U.S. Appl. No. 13/645,210, dated Dec. 7, 2012 through Sep. 26, 2013, 59 pp.
'What can NFC do? RIM, NFCLauncher—p. 7—BlackBerry Forums at Crackberry.com, retrieved from http://forums.crackberry.com/blackberry-bold-9930-9900-f235/what-can-nfc-do-rim-nfcl . . . , accessed on Oct. 20, 2011, 10 pp.
YouTube, NFCLauncher—YouTube, retrieved from http://www.youtube.corniwatch?v=GqD_olNY8Js, accessed on Oct. 20, 2011, 2 pp.
International Preliminary Report on Patentability from counterpart International Application No. PCT/US2014/0404924, mailed Dec. 17, 2015, 9 pp.

* cited by examiner

MAINTAINING VIDEO CONFERENCE SESSION CONTINUITY DURING TRANSFER OF SESSION TO ALTERNATIVE DEVICE

BACKGROUND

Modern communication devices enable users to interact with each other in a variety of different formats during various communication sessions. Communication devices equipped with both microphones and video cameras enable users to engage in face-to-face group meetings at remote locations, e.g. videoconferences. Such video meetings often rely on Internet-based communication protocols such as "Voice over IP" (VoIP). Streams of video and audio packets are created, transmitted across the internet, and decoded and reassembled in a manner permitting each recipient to hear and see the other participants in a face-to-face manner in real time.

Various client communication devices support the aforementioned communication sessions. Some client devices, such as smart phones, tablets, and PDAs are typically handheld, though they can also be docked at docking stations and mounted in various ways. The high degree of portability of such devices enables users to communicate with other users from nearly any location with access to a wired or wireless network. These portable devices enable users to maintain communications with other users while moving between real world locations. For example, a businessman may continue a conversation begun in an office while traveling to an airport to catch a flight. Other client devices may be less portable but have suites of features that enhance the communication session user experience. For example, laptop computers are somewhat less portable than smart phones and table computers, but their larger screen and ability to sit upright without a user's assistance afford an improved user experience. Similarly, non-portable client devices, such as desktop computers and televisions, may offer a suite of features that further enhances the user experience. For example, a user who is situated in an office may prefer a desktop computer to a smart phone for a video conference due to the larger screen size, the ability of the computer to sit upright, and the ease with which multiple tasks can be accomplished on a desktop computer.

SUMMARY

Implementations of the present disclosure provide systems and methods for seamlessly transferring a communication session from a first client device to a second client device via a close-range communication connection, such as a connection that utilizes near field communication (NFC) technologies. Implementations contemplate serializing a set of unique identifiers pertaining to a communication session and transmitting the set of serialized unique identifiers from the first client device to the second client device via, e.g. NFC technologies. The second client device can thereafter de-serialize the set of unique identifiers and transmit a request to a communication session server to assume control of the session from the first client device. A communication session server may perform an authentication of the second client device that requires the second client device to provide credentials associated with a user account. In some implementations, the present disclosure provides for creating a temporary use token that enables a client device to temporarily acquire privileges associated with a user account and for transferring the temporary use token to the second client device. A communication session can thereby be transferred from a first device to a second device while session continuity is maintained and without increasing the number of participants in the communication session. In some implementations, a temporary use token is created and transferred to the second device in order to allow the second device to temporarily acquire privileges associated with the first client device.

One implementation consists of a method, executed by one or more processors at a transferee endpoint, for seamlessly transferring a communication session from a transferor endpoint via a close-range communication connection, the method comprising receiving, by the transferee endpoint via the close-range communication connection, serialized communication session data from the transferor endpoint, de-serializing, at the transferee endpoint, the serialized communication session data received from the transferor endpoint, transmitting, from the transferee endpoint to a communication session server, communication session identifiers and a request to continue the communication session on the transferee device, receiving, at the transferee endpoint from the communication session server, a request to authenticate a user account associated with the communication session, and transmitting, from the transferee endpoint to the communication session server, data necessary to authenticate the user account associated with the communication session.

An additional implementation consists of a method, executed at a communication session server, for seamlessly transferring a communication session from a transferor endpoint to a transferee endpoint via a close-range communication connection, the method comprising creating an identifier for the communication session and an identifier for the transferor endpoint, transmitting the identifiers for the communication session and the transferor endpoint to the transferor endpoint, receiving, from the transferee endpoint, the identifiers for the communication session and the transferor endpoint and a request to continue the communication session at the transferee endpoint, authenticating a user account on the transferee endpoint, and receiving, from the transferee endpoint, input into the communication session, wherein the user account was used to initiate the communication session, and wherein the transferee endpoint acquired the identifiers for the communication session and the transferor endpoint from the transferor endpoint via a close-range communication connection.

An alternative implementation consists of a system for seamlessly transferring a communication session from a transferor endpoint to a transferee endpoint via a close-range communication connection, the system comprising the transferor endpoint, comprising one or more processors and computer readable media, wherein the transferor endpoint is configured to serialize communication session data and to transmit serialized communication session data to the transferee endpoint via a close-range communication connection, the transferee endpoint, comprising one or more processors and computer readable media, wherein the transferee endpoint is configured to receive communication session data from the transferor endpoint via a close-range communication connection, to deserialize communication session data, to transmit communication session identifiers to a communication session server, to transmit a request to continue the communication session initiated on the transferor endpoint at the transferee endpoint, and to authenticate a user account used to initiate the communication session, and a communication session server, comprising one or more processors and computer readable media, wherein the communication session server is configured to create a communication session identifier and an endpoint identifier corresponding to the transferor endpoint, to transmit, to the transferor endpoint, the communication session identifier and the endpoint identifier corresponding to the transferor endpoint, to receive a request from the transferee endpoint to continue the communication session initiated at the transferor endpoint at the transferee endpoint, to perform an authentication procedure to verify that the transferee endpoint has permissions associated with a user account, to begin receiving communication session input from the transferee endpoint, and to terminate reception of communication session input from the transferor endpoint.

DETAILED DESCRIPTION

Figure 1:
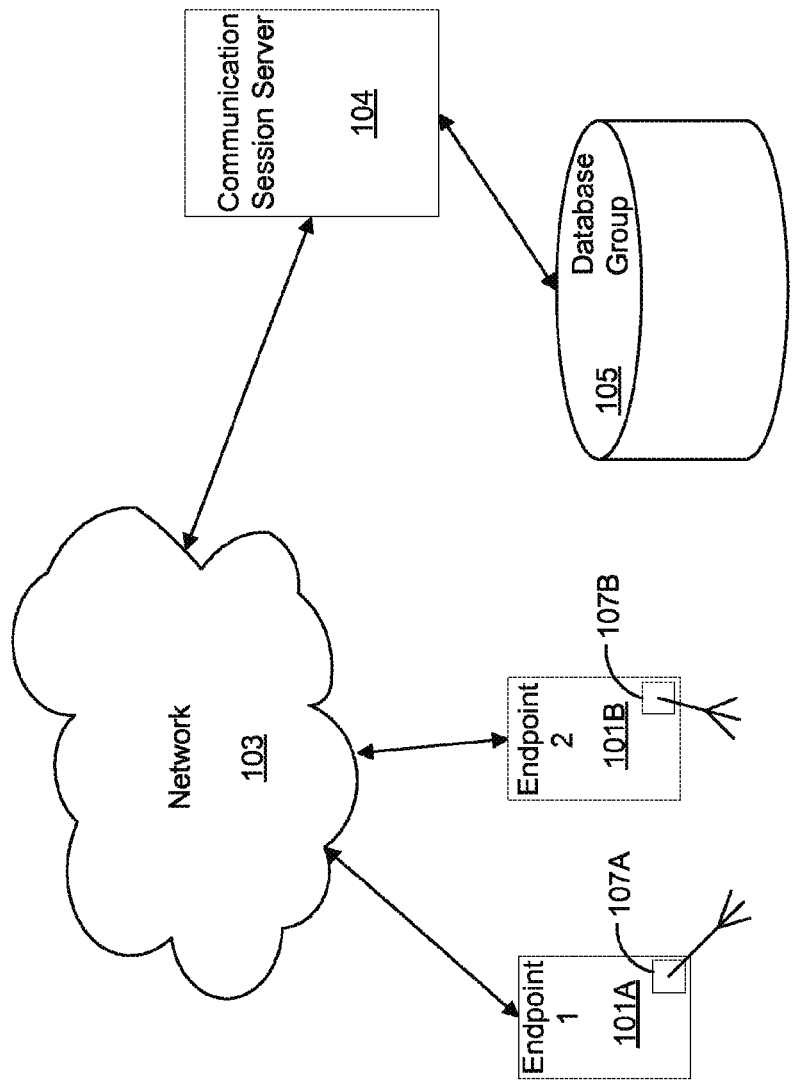
FIG. 1 is a block diagram of an example environment in which the methodology for transferring a communication session from a first endpoint to a second endpoint may be implemented.

FIG. 1 is a block diagram of an example communications environment in which various embodiments of the present disclosure may be implemented. In the environment depicted by FIG. 1, multiple client devices, or endpoints 101, are connected to a network 103. Clients 101 are equipped with close-range communication elements, such as near field communications (NFC) elements 107. NFC elements 107 enable endpoints 101 to establish radio communications with each other when they are touched together or brought into close proximity. For example, endpoint A 101A is capable of establishing a communicative connection that utilizes NFC standards with endpoint B 102B when NFC elements 107A and 107B are brought within close proximity. In some implementations, close-range communication elements establish connections between the endpoints 101 using protocols that do not conform with the NFC standards. The multiple endpoints 101 are connected to a communication session server 104 through a data network 103. The communication session server 104 is additionally connected to database group 105.

Any of endpoints 101 may be a smart phone, a personal digital assistant (PDA), a tablet computer, a laptop computer, a desktop computer, a television, a video-game console, or any one of a number of additional devices that may enable a user to access a communication session. In general, endpoints 101 are equipped with a microphone, a video camera, and an output device that allow users to both provide input to and to receive output from a communication session hosted by communication session server 104. Endpoints 101 are equipped with close-range communication elements, such as NFC elements 107. NFC elements 107 may be capable of producing, transmitting, and receiving radio frequency signals and enable endpoints 101 to establish communicative connections through NFC protocols.

The example environment also contains a network 103 that connects the multiple endpoints 101 to the server array 104. Network 103 may be either a wired or a wireless network. Example networks include but are not limited to an LTE network, a GSM network, a CDMA network, a fiber optic network, and other voice or data networks. Network 103 may also include elements of WLAN or WPAN networks that enable endpoints 101 to connect to other components of the network, for example an LTE network. The Network 103 allows the multiple endpoints 101 to communicate with the communication session server 104. For example, the endpoints 101 may transmit information to the communication session server 104 and receive information from the communication session server 104. In particular, endpoints 101 may create both voice and data packets and transmit such data packets through network 103. Network 103 may include a set of cell towers, as well as a set of base stations and/or mobile switching centers (MSCs). As appreciated by those skilled in the art, network 103 may include various cell tower/base station/MSC arrangements. For example, a base station and a cell tower could be co-located at the same site or they could be remotely located, and a single base station could be coupled to various cell towers or various base stations could be coupled to a single MSC, to name but a few of the possible arrangements. Alternatively or in addition to the aforementioned components of data network 103, the data network 103 may include one or more IP multimedia subsystems (IMS), serving gateways (SGW), and evolved node Bs (eNB). One of ordinary skill in the art will recognize that additional components not mentioned herein may be used by network 103.

Communication session server 104 is connected to the endpoints 101 through network 103. The connection enables the communication session server 104 to both receive data from endpoints 101 and transmit data to endpoints 101. In general, the communicative connections between multiple endpoints 101 and the communication session server 104 through the network 103 enables multiple endpoints, and users using such endpoints, to use various communication tools to interact, collaborate, and share information in a virtual environment. The virtual environment supported by the endpoints 101, the network 103, and the communication session server 104 enables users to share an experience substantially similar to the experience they might have by interacting at the same physical location.

Communication session server 104 comprises processors and memory configured to receive information from a multitude of endpoints 101 and to provide information to a multitude of endpoints 101. The information received by the communication session server 104 may be made up of data packets, video packets, and voice packets that carry the information exchanged during a communication session. In addition to being configured to exchange video, voice, and data packets, processors and memory located at the communication session server 104 may be configured to receive a request from one endpoint, such as endpoint 101B, to have a communication session transferred from a second endpoint, such as endpoint 101A, and to verify that the transferee endpoint (in this case endpoint 101B) has permissions associated with a user account that was used to connect with the communication session on the transferee device (in this case endpoint 101A). Furthermore, communication session server 104 may be configured to receive a request from a first endpoint, e.g. endpoint 101A, to create a temporary use token that will enable a second endpoint, e.g. endpoint 101B, to have privileges associated with a user account linked to the first endpoint, to create such a temporary use token, and to transmit the temporary use token to the first endpoint or to the second endpoint. Processors and memory located at the servers within the server array 104 may also be configured to both access information stored at a database and to store information at a database, such as a database in database group 105. For example, communication session server 104 may be configured to store information pertaining to the creation of a temporary use token at a database in database group 105 and to access information pertaining to a temporary use token from a database in database group 105. Access to some information stored at databases may be limited and may require some form of authentication prior to access. For example, information related to a particular user account may be limited pursuant to the settings of such user account, and communication session server 104 may only access such information in the event that a user account has provided authorization for the communication session server to access such information.

Communication session server 104 is also connected to a database group 105. Database group 105 may store a variety of information, including, e.g., information pertaining to one or more user accounts. Information pertaining to the one or more user accounts may include but is not limited to a user account name, the name of a user to whom the user account belongs, an alias for the user account, verification information for the user account, a social network profile associated with the user account, images associated with the user account, documents and media content associated with the user account, and various user account settings.

Implementations of the present disclosure provide systems and methods for seamlessly transferring a video conference session from a first client device to a second client device via near field communication (NFC) technologies. Implementations contemplate serializing a set of unique identifiers pertaining to a video conference session and transmitting the set of serialized identifiers from the first client device, or first endpoint, to the second client device (second endpoint) via NFC technologies. The second client device can thereafter de-serialize the set of unique identifiers and transmit a request to a communication session server to assume control of the communication session from the first client device. A communication session server may perform an authentication of the second client device that requires the second client device to provide credentials associated with a user account. In some implementations, the present disclosure provides for creating a temporary use token that enables a client device to temporarily acquire privileges associated with a user account and for transferring the temporary use token to the second client device. A communication session can thereby be transferred from a first endpoint to a second endpoint while session continuity is maintained and without increasing the number of participants in the communication session. In some implementations, a temporary use token is created and transferred to the second device in order to allow the second device to temporarily acquire privileges associated with the first client device.

Implementations of the present disclosure contemplate serializing communication session identifier data structures and communication session participant identifier data structures. In some implementations, the communication session identifier and participant identifier data structures are created, provided, and/or assigned by a communication session server. In other implementations, one or more of the communication session identifier and participant identifier data structures are created, provided, and/or assigned by a client device endpoint. The serialization of the identifier data structures converts the data structures to a format that can be transmitted from a first endpoint to a second endpoint using close-range communication technologies. In some implementations, the close range communication technologies utilize protocols that conform with near field communication (NFC) standards. Alternative implementations may utilize alternative close-range communication protocols. The NFC standards cover communications protocols and data exchange formats and enable data to be exchanged between devices that are brought within close proximity of each other. Therefore, once the communication session identifier and participant identifier data structures have been serialized, a first client device endpoint can transmit the identifiers to a second client device endpoint through an NFC communication link established when the two devices are brought within close proximity of each other. For example, a user could touch a smart phone to an NFC element of a television and thereby transmit identifiers for a communication session to the television.

During transfer of a communication session from a first client endpoint to a second client endpoint, implementations of the present disclosure further contemplate communication between one or both endpoints and a communication session server. In some implementations, the transferor endpoint, i.e. the endpoint participating in the communication session prior to the transfer, sends a request to the communication session server alerting the communication session server of an intent to transfer the communication session to a second endpoint. In other implementations, the first client endpoint will not communicate with the communication session server regarding the transfer of the communication session to the second endpoint and instead all communications regarding transfer of the session will take place between the transferee endpoint, i.e. the endpoint participating in the communication session after the transfer, and the communication session server. In yet other implementations, both the transferor and transferee endpoints communicate with the communication session server regarding the transfer of the communication session from the first endpoint to the second endpoint.

In various implementations, the communications between the transferor endpoint and the communication session server may include but are not limited to a request to transfer the communication session sent by the transferor endpoint and an acknowledgement of such request by the communication session server, and a request sent by the transferor endpoint to obtain identifier data structures and/or serialized identifier data structures from the communication session server and the transmission of such data structures by the communication session server. The communications between the transferee endpoint and the communication session server may include but are not limited to, in various implementations, a request sent by the transferee endpoint to take over the communication session from the transferor endpoint that includes identifiers for the communication session and for the transferor endpoint and an acknowledgement of such request from the communication session server, and a request for user account credentials sent from the communication session server to the transferee endpoint and a corresponding transmission of user account credentials from the transferee endpoint to the communication session server. The communications between the transferor endpoint and the transferee endpoint include but are not limited to a request to transfer serialized communication session and endpoint identifiers from the transferor endpoint, an acknowledgement of such a request from the transferee endpoint, the transfer of serialized identifiers from the transferor endpoint to the transferee endpoint, and the acknowledgement of the safe receipt of the serialized identifiers from the transferee endpoint to the transferor endpoint.

In additional implementations, the present disclosure contemplates the creation of a temporary use token that enables a client device endpoint to temporarily assume the privileges associated with a particular user account. For example, if a client device endpoint is currently participating in a communication session with the privileges associated with a particular account and a request is made to transfer the communication session in which the client device endpoint is currently participating to a second client device endpoint that is not affiliated with the user account, the second client device endpoint may be unable to assume the participation privileges of the first endpoint in the communication session unless the second endpoint can temporarily acquire the privileges associated with the user account. A temporary use token enables the second endpoint to acquire such privileges. The temporary use token may be created by a first client device endpoint, by a communication session server, or the creation of the temporary use token may be a joint effort between both the first client device endpoint and the communication session server. In some implementations, the creation of a temporary use token is triggered by an attempt to transfer serialized communication session identifiers via a close-range communication connection, such as an NFC connection, between a transferor endpoint linked to a particular user account and a transferee endpoint that is not linked to the user account. Such implementations may involve a request sent from the transferor endpoint to the transferee endpoint via NFC to indicate whether the transferee endpoint has privileges associated with a particular user account. If the transferee endpoint responds to such a request by indicating that it does not have privileges associated with the particular user account, the transferor endpoint may request that the communication session server create a temporary use token granting privileges associated with the particular user account.

The temporary use token may be transmitted from a transferor endpoint to a transferee endpoint through an NFC connection or through an alternative close-range communication connection. For example, a transferor endpoint may request that a communication session server create a temporary use token and respond to the request by transmitting the token or a copy thereof back to the transferor endpoint. Thereafter, the transferor endpoint may transfer the temporary use token to the transferee endpoint. The temporary use token may be identified by a data structure known only to the transferor endpoint and the hangout server and may further include data structures providing privileges associated with a particular user account, an expiration time, and for storing past use history. Alternatively, the temporary use token may be transmitted from a communication session server or other server to a transferee endpoint or the temporary use token may be maintained at a communication session server. In implementations where the temporary use token is maintained at a communication session server, the use of the temporary use token may be limited to one or more previously identified client devices.

Embodiments of the present invention thereby provide for the seamless transfer of a communication session from a first client device endpoint to a second client device endpoint via close-range communication connection between the first and second client device endpoints. The present disclosure thus provides systems and methods that can be used by users of client devices to seamlessly transfer a communication session begun on a first device, e.g. a smart phone, to a second device, e.g. a television. The present invention enables users to transition from using a first client device for a communication session to a second client device with a superior suite of features without interrupting the communication session from the perspective of other conference attendees. Furthermore, the present invention enables the transition from a first client device to a second client device merely by bringing the first client device within close proximity of a close range communication element of the second client device and possibly without requiring that the user navigate any on-screen menus.

Figure 2:
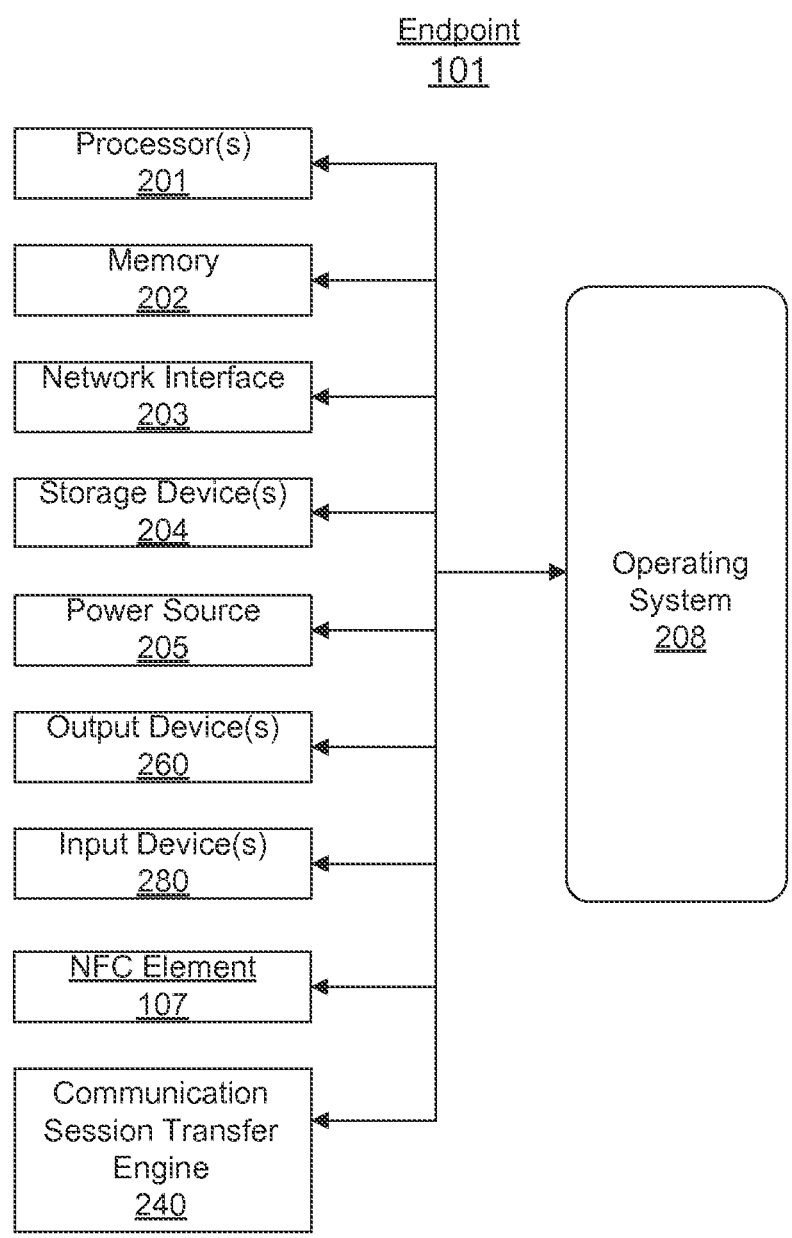
FIG. 2 is a block diagram of the basic functional components for an example endpoint in FIG. 1, according to one aspect of the disclosure.

Turning now to FIG. 2, one particular example of a client device endpoint 101 is illustrated. In general, many other embodiments of the endpoint 101 may be used as long as the embodiment is capable of acquiring information from a resource or property and transmitting information and requests to a server or server array through a network. In the illustrated embodiment of FIG. 2, the endpoint 101 includes one or more processors 201, memory 202, a network interface 203, one or more storage devices 204, a power source 205, one or more output devices 260, and one or more input devices 280. The endpoint 101 also includes an operating system 208 that is executable by the endpoint and further includes a communication session transfer engine 240. In a conventional fashion, each of components 201, 202, 203, 204, 205, 260, 280, 208, and 240 are interconnected physically, communicatively, and/or operatively for inter-component communications.

As illustrated, processors 201 are configured to implement functionality and/or process instructions for execution within endpoint 101. For example, processors 201 execute instructions stored in memory 202 or instructions stored on storage devices 204. Memory 202, which may be a non-transient, computer-readable storage medium, is configured to store information within endpoint 101 during operation. In some embodiments, memory 202 includes a temporary memory, i.e. an area for information not to be maintained when the endpoint 101 is turned off. Examples of such temporary memory include volatile memories such as random access memories (RAM), dynamic random access memories (DRAM), and static random access memories (SRAM). Memory 202 also maintains program instructions for execution by the processors 201.

Storage devices 204 also include one or more non-transient computer-readable storage media. Storage devices 204 are generally configured to store larger amounts of information than memory 202. Storage devices 204 may further be configured for long-term storage of information. In some examples, storage devices 204 include non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The endpoint 101 uses network interface 203 to communicate with external devices via one or more networks, such as the network 103 of FIG. 1. Such networks may include one or more wireless networks, wired networks, fiber optics networks, and other types of networks through which communication between the endpoint 101 and an external device may be established. Network interface 203 may be a network interface card, such as an Ethernet card, an optical transceiver, a radio frequency transceiver, or any other type of device that can send and receive information. Other non-limiting examples of network interfaces include Bluetooth®, 3G and WiFi radios in mobile computing devices, and USB.

The endpoint 101 includes one or more input devices 280. Input devices 280 are configured to receive input from a user through tactile, audio, and/or video feedback. Non-limiting examples of input device 280 include a presence-sensitive screen, a mouse, a keyboard, a voice responsive system, video camera, microphone or any other type of device for detecting a command from a user. In some examples, a presence-sensitive screen includes a touch-sensitive screen.

One or more output devices 260 are also included in endpoint 101. Output devices 260 are configured to provide output to a user using tactile, audio, and/or video stimuli. Output device 260 may include a display screen (which may be part of a presence-sensitive screen), a sound card, a video graphics adapter card, or any other type of device for converting a signal into an appropriate form understandable to humans or machines. Additional examples of output device 260 include a speaker, a cathode ray tube (CRT) monitor, a liquid crystal display (LCD), or any other type of device that can generate intelligible output to a user.

The endpoint 101 includes one or more power sources 205 to provide power to the client. Non-limiting examples of power source 205 include single-use power sources, rechargeable power sources, and/or power sources developed from nickel-cadmium, lithium-ion, or other suitable material.

The endpoint 101 includes an operating system 208, such as the Android® operating system. The operating system 208 controls operations of the components of the endpoint 101. For example, the operating system 208 facilitates the interaction of resource/property tracking engine 240 with processors 201, memory 202, network interface 203, storage device(s) 204, input device 280, output device 260, and power source 205.

NFC element 107 enables endpoint 101 to establish an NFC connection with a separate endpoint. NFC element 107 allows contactless transactions, data exchange, and simplified setup of more complex communications through short range radio communication. Communication session transfer engine 240 typically includes program instructions and/or data that are executable by the endpoint 101. In some embodiments, the communication session transfer engine 240 is a part of operating system 208 executing on the endpoint 101. The communication session transfer engine 240 includes program instructions and/or data that are executable by the endpoint 101. The program instructions and data included in the communication session transfer engine 240 include instructions for determining that the NFC element 107 of the endpoint 101 is within sufficient proximity of an NFC element of a separate endpoint to establish an NFC connection with the separate endpoint, to determine whether or not a separate endpoint with which an NFC connection can be established has privileges associated with a particular user account, to request a temporary use token from a communication session server, to request communication session and participant identifier data structures, to serialize identifier data structures, to establish an NFC connection with a separate endpoint, and to transmit identifier data structures and temporary use tokens through an NFC connection with a separate endpoint.

Figure 3:
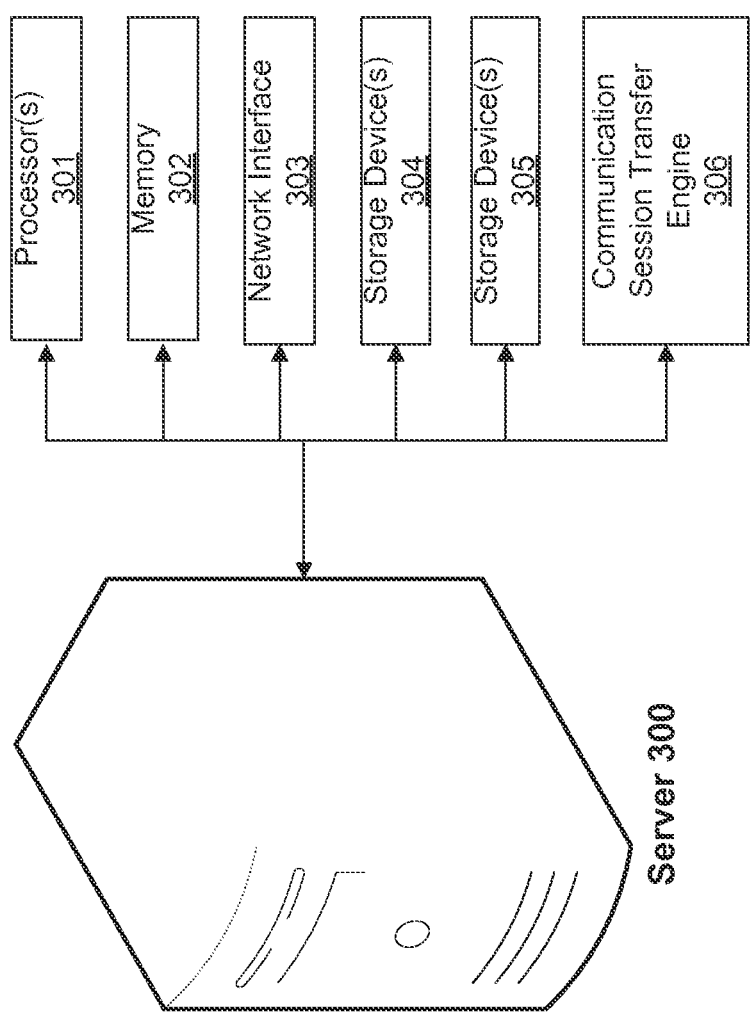
FIG. 3 is a block diagram of the basic functional components for a server, according to one aspect of the disclosure.

Moving to FIG. 3, a block diagram of basic functional components for a communication session server 300, according to one aspect of the disclosure, is depicted. The communication session server 300 includes one or more processors 301, memory 302, a network interface 303, one or more storage devices 304, and a connection record engine 305. In a conventional fashion, each of components 301, 302, 303, 304, and 305 are interconnected physically, communicatively, and/or operatively for inter-component communications.

As illustrated, processors 301 are configured to implement functionality and/or process instructions for execution within communication session server 300. For example, processors 301 execute instructions stored in memory 302 or instructions stored on storage devices 304. Memory 302, which may be a non-transient, computer-readable storage medium, is configured to store information within communication session server 300 during operation. In some embodiments, memory 302 includes a temporary memory, i.e. an area for information to be maintained when the communication session server 300 is turned off Examples of such temporary memory include volatile memories such as random access memories (RAM), dynamic random access memories (DRAM), and static random access memories (SRAM). Memory 302 also maintains program instructions for execution by the processors 301.

Storage devices 304 also include one or more non-transient computer-readable storage media. Storage devices 304 are generally configured to store larger amounts of information than memory 302. Storage devices 304 may further be configured for long-term storage of information. In some examples, storage devices 304 include non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The communication session server 300 uses network interface 303 to communicate with external devices via one or more networks, such as the network 103 of FIG. 1. Such networks may include one or more wireless networks, wired networks, fiber optics networks, and other types of networks through which communication between the communication session server 300 and an external device may be established. Network interface 303 may be a network interface card, such as an Ethernet card, an optical transceiver, a radio frequency transceiver, or any other type of device that can send and receive information.

Communication session 305 is hosted by the communication session server 300. Communication server 300 connects various endpoints, such as endpoint 101 of FIG. 2, to the communication session. The server side communication session transfer engine 306 includes program instructions and/or data that are executable by the server 300. The program instructions and data included in the server side communication session transfer engine 305 include instructions to provide communication session identifiers and participant identifiers to an endpoint, to receive a request to transfer a communication session from a transferor endpoint to a transferee endpoint, to verify that a transferee endpoint has privileges associated with a particular user account used in the communication session, to change the source of video, audio, and data packets provided to a communication session from a first endpoint to a second endpoint, to change the destination of video, audio, and data packets provided to a communication session from a first endpoint to a second endpoint, to receive a request to create a temporary use token, to create a temporary use token, and to transfer a temporary use token to an endpoint. information pertaining to events indicating the cessation of use of a resource or the abandonment of a piece of property and to store such information in memory.

Figure 4:
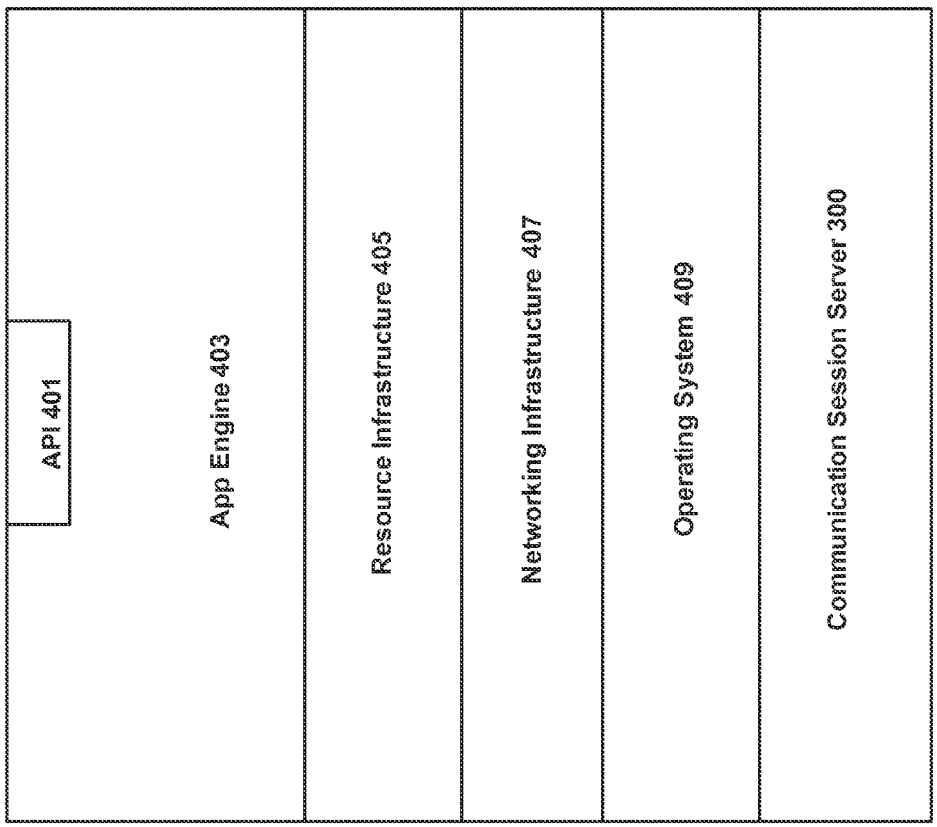
FIG. 4 is a block diagram of an application programming interface of an application engine that provides resources to a communication session, according to one aspect of the disclosure.

Turning now to FIG. 4, in one embodiment, an application programming interface (API) 401 of an application engine or app engine 403 provides many resources to the communication session 305. In turn, the app engine 403 depends on resources provided from an API exposed by a resource infrastructure layer 405 and a networking infrastructure layer 407, which are supported by the communication session server 300 and its operating systems 409. The app engine 403 and the resource infrastructure layer 405 connect HTTP requests from client endpoints to the communication session 305. The app engine 403 also provides a runtime environment for the communication session 305 and further provides access to a database in the resource infrastructure layer 405 for persistent storage requirements of the communication session 305.

Through its API 401, the app engine 403 provides the communication session 305 access to resources on the Internet, such as web services or other data. The app engine 403 retrieves web resources using the resource infrastructure layer 405. The communication session 305 also sends and receives messages using the app engine 403 and the resource infrastructure layer 405. The app engine 403 and the resource infrastructure layer 405 also support a cache, which provides high speed access to temporary data or data copied from a data store. The resource infrastructure layer 405 further supports a file system and scheduling resources.

Figure 5:
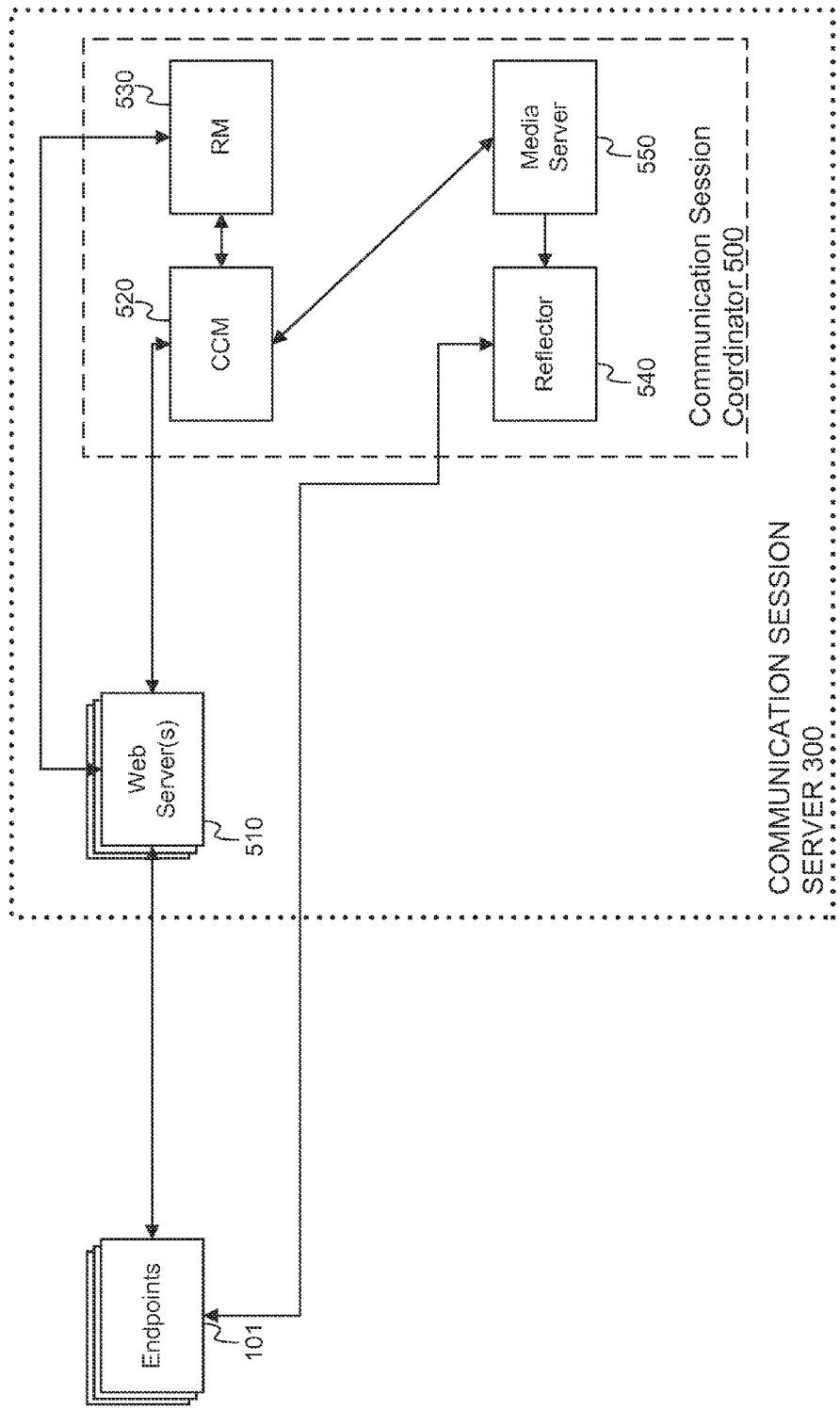
FIG. 5 is a block diagram illustrating an architecture for establishing a communication session among multiple endpoints, according to one aspect of the disclosure.

FIG. 5 depicts a block diagram illustrating an architecture for establishing a communication session among multiple endpoints, such as endpoints 101A and 101B of FIG. 1, which includes the communication session server 300. Endpoints establish a communication session with one or more web servers 510 which interface with a communication session coordinator 500. The one or more web servers 510 provide control signaling with respect to the audio, video, and data packets associated with a communication session in order to assign the packets to an appropriate location. In some implementations, the one or more web servers 501 utilize communication session identifier data structures during the provision of control signaling. In some implementations, the one or more web servers 510 may form part of the communication session server 300.

The communication session coordinator 500 is responsible for maintaining the communication session 305 and for providing content to the endpoints connected to a communication session. The communication session coordinator 500 includes a contact center module 520, a room manager module 530, a reflector 540, and a media server 550. FIG. 5 only depicts a single reflector 540 corresponding to a particular communication session, i.e. communication session 305, but a plurality of reflectors may reside on communication server 300. Furthermore, while FIG. 5 depicts the contact center module 520, the room manager module 530, the reflector 540, and the media server 550 as being part of communication session server 300, it will be appreciated that the implementation of these modules may be spread across different tangible servers and that certain modules, e.g. the media server 550, may be a separate component in communication with the modules of the communication session server 300. It will further be appreciated that certain modules can be combined into a single module. In other embodiments, the various components may be integrated into a single platform while maintaining their individual functionality and identity, such platform may be a single server or distributed applications.

With respect to the endpoints 101, the one or more web servers 510 perform signaling with respect to the contact center module 520 and the room manager module 530 in order to locate or generate an appropriate communication session identifier data structure, which in some implementations is analogous to a URL corresponding to the communication session. It will be appreciated that for inbound calls that are new interactions with the communication session production environment, a communication session identifier data structure generally does not previously exist. In such cases, the contact center module 520 sends a request for the room manager module 530 to generate a new communication session identifier data structure and receives the newly generated communication session identifier data structure back from the room manager module 530. The communication session identifier data structure also corresponds to a particular reflector 540 associated with the particular communication session, i.e. communication session 305, and is used to establish a connection between the endpoints 101 and the particular reflector 540. Furthermore, the contact center module 520 may assign a participant identifier data structure to each endpoint participating in the communication session.

The reflector 540 receives content from several separate sources (e.g., from different endpoints and from media server 550) and buffers all incoming packets before synchronizing them and reordering them into various data sessions corresponding to each endpoint connected to the particular communication session, i.e. communication session 305. The contact center module 520 sends control signals to the media server 550 to determine what resources the media server 550 sends to the reflector 540 for provision to the endpoints 101. The media server 550 provides a variety of media resources, such as video content, audio content, and various documents that are linked to one or more user accounts that are participants in the communication session.

Figure 6:
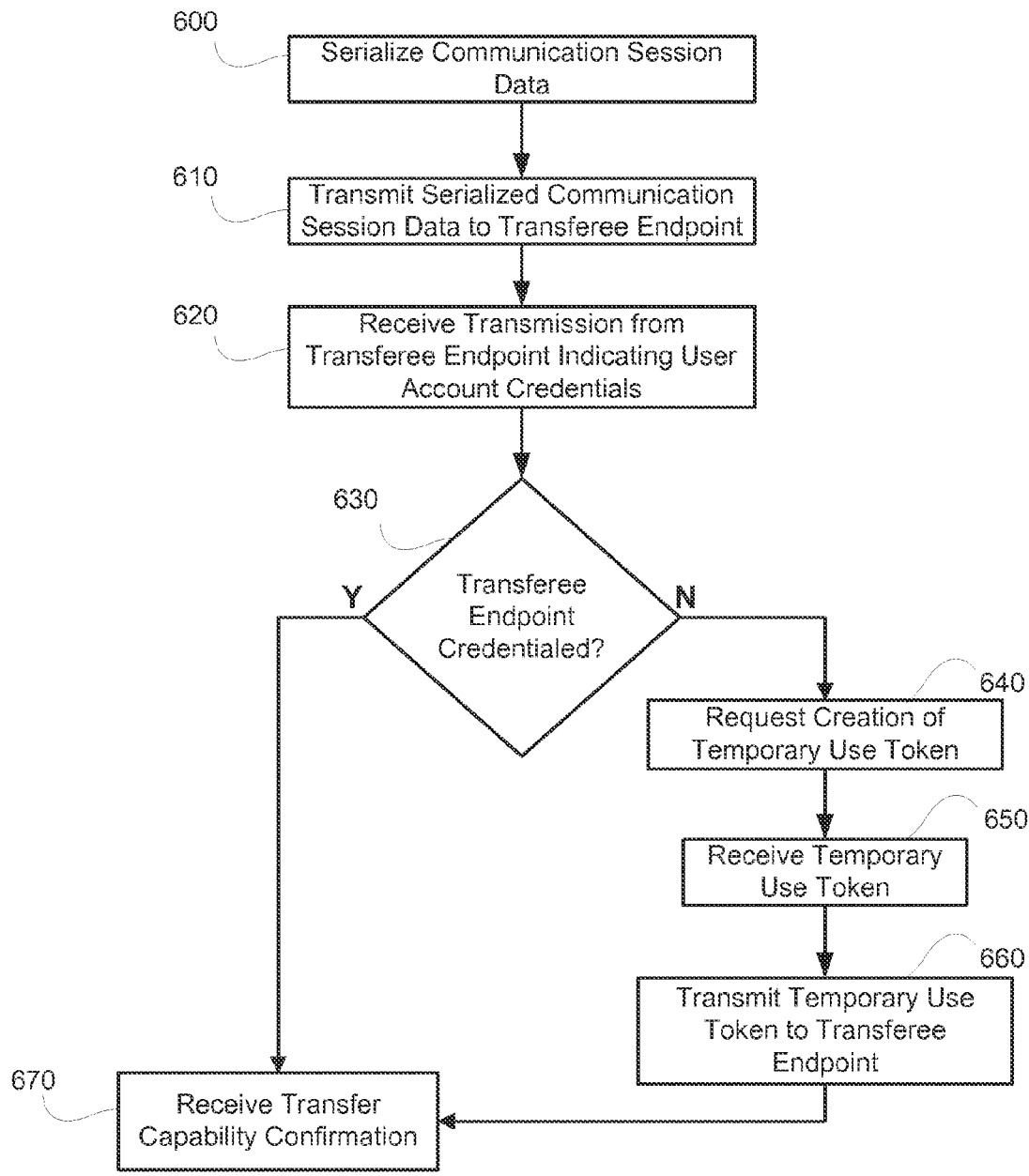
FIG. 6 is a flowchart depicting a method, implemented at a transferor endpoint, for transferring a communication session from the transferor endpoint to a transferee endpoint, according to one aspect of the disclosure.

FIG. 6 is a flowchart depicting a method, implemented at a transferor endpoint, for transferring a communication session from the transferor endpoint to a transferee endpoint, according to one aspect of the disclosure. At 600, the transferor endpoint serializes communication session data. The transferor endpoint is a client device include may be but is not limited to one of the following: a smart phone, a personal digital assistant (PDA), a tablet computer, a laptop computer, a desktop computer, a television, a video-game console, or any one of a number of additional devices that may enable a user to access a communication session. The communication session data that is serialized at 600 may include but is not limited to communication session identifier data structures and communication session participant identifier data structures. In various implementations, the communication session identifier and participant identifier data structures may be created, provided, and/or assigned by a communication session server, or the communication session identifier and participant identifier data structures may be created, provided, and/or assigned by the transferor endpoint. For example, the communication session identifier data structures and communication session participant identifier data structures may be created by the communication session coordinator 500 of the communication session server 300 or by modules thereof. Furthermore, the serialized communication session data may include an identifier data structure for a user account participating in the communication session that is to be transferred. At 610, the transferor endpoint transmits the serialized communication session data to the transferee endpoint via an NFC connection. The NFC connection between the transferor endpoint and the transferee endpoint is established when the two endpoints are brought within close proximity of one another.

In addition to transferring the serialized communication session data, the transferor endpoint may also transmit a request to the transferee endpoint at 610 querying the transferee endpoint to report whether or not the transferee endpoint has privileges associated with the user account with which the transferor endpoint is participating in the communication session. At 620, the process receives a transmission from the transferee endpoint indicating whether or not the transferee endpoint possesses credentials associated with a user account. At 630, the process determines whether the transferee endpoint possesses the credentials associated with the user account. If the process determines that the user account is authenticated on the transferee endpoint at 630, then the process proceeds to 670.

However, if the process determines that the user account is not authenticated on the transferee endpoint at 630, the process proceeds to 640. At 640, the transferor endpoint requests the creation of a temporary use token. In some implementations, the request is submitted to the communication session server. In alternative implementations, the request may be transmitted to a web server hosting the user account data. At 650, the transferor endpoint receives the temporary use token. In some implementations, the temporary use token is a data structure that contains data substructures pertaining to, for example, the time at which the token was created, an identifier for the user account for which the token confers the privileges and credential of, an identifier data structure for a communication session to which the token provides access, and a unique identifier for the token. A unique identifier for the token may also be stored at a communication session server, e.g. at a communication session coordinator module. The temporary use token temporarily grants a client device endpoint the credentials associated with the user account participating in the communication session and temporarily enables the client device endpoint to assume the privileges associated with the particular user account. In some implementations, the temporary use token may become invalid at a particular time or after a particular amount of time has lapsed after the token was created. Temporary use tokens may also be managed by the user account. For example, a user may log into a user account and delete or otherwise modify active temporary use tokens.

At 660, the transferor endpoint transmits the temporary use token to the transferee endpoint via the NFC connection. Transferring the temporary use token to the transferee endpoint enables a user to transfer the communication session to the transferee device even if the transferee device is not affiliated with the user account. For example, transferring the temporary use token to the transferee device may enable a user to continue a communication session on the transferee device even if the transferee device is a public device.

At 670, the transferor endpoint receives a confirmation from the transferee endpoint that the transferee endpoint has the capability to successfully obtain the communication session from the transferor endpoint. In some implementations, the receipt of the acknowledgment at 670 may cause the transferor endpoint to provide output. For example, the transferor endpoint may vibrate or play a sound upon receipt of the acknowledgement at 670.

Figure 7:
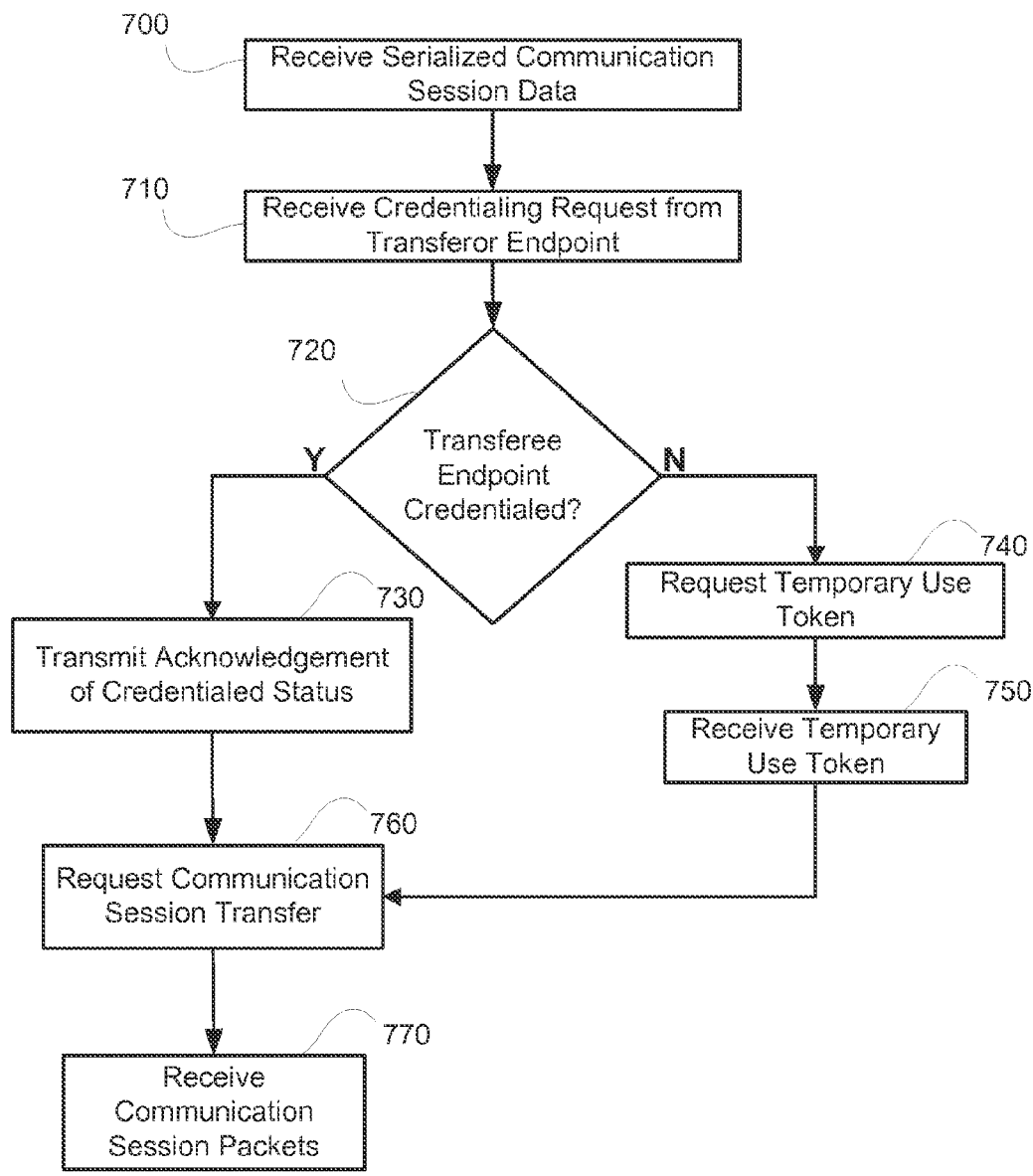
FIG. 7 is a flowchart depicting a method, implemented at a transferee endpoint, for transferring a communication session from a transferor endpoint to the transferee endpoint, according to one aspect of the disclosure.

FIG. 7 is a flowchart depicting a method, implemented at a transferee endpoint, for transferring a communication session from a transferor endpoint to the transferee endpoint, according to one aspect of the disclosure. At 700, the transferee endpoint receives serialized communication session data from the transferor endpoint via a near field communication (NFC) connection. The transferor endpoint and the transferee endpoint are client devices which include but are not limited to a smart phone, a personal digital assistant (PDA), a tablet computer, a laptop computer, a desktop computer, a television, a video-game console, or any one of a number of additional devices that may enable a user to access a communication session. The serialized communication session data received at 700 may include but is not limited to communication session identifier data structures and communication session participant identifier data structures. The communication session identifier and participant identifier data structures may be created, provided, and/or assigned by a communication session server, or the communication session identifier and participant identifier data structures may be created, provided, and/or assigned by the transferor endpoint.

At 710, the transferee endpoint receives a request from the transferor endpoint to report whether or not the transferee endpoint has credentials associated with a particular user account. The particular user account is the user account used by the transferor endpoint to access the communication session. In some implementations, the request from the transferor endpoint is sent via an NFC connection and includes an identifier for the user account. At 720, the transferee endpoint determines whether or not it has the credentials associated with the particular user account identified in the request sent from the transferor endpoint at 710. If the transferee endpoint does have the credentials associated with the particular user account, the process proceeds to step 730 where the transferee endpoint transmits an acknowledgement to the transferor endpoint that the credentials associated with the user account endpoint are possessed by the transferee endpoint. Thereafter the process proceeds to 760.

Alternatively, if the transferee endpoint does not possess the credentials associated with the transferor endpoint, the process proceeds to step 740 where the transferee endpoint responds to the transferor endpoints request by requesting a temporary use token from the transferor endpoint. At 750, the transferee endpoint receives the temporary use token from the transferor endpoint. In some implementations, the temporary use token is a data structure that contains data substructures pertaining to, for example, the time at which the token was created, an identifier for the user account for which the token confers the privileges and credential of, an identifier data structure for a communication session to which the token provides access, and a unique identifier for the token. A unique identifier for the token may also be stored at a communication session server, e.g. at a communication session coordinator module. The temporary use token temporarily grants a client device endpoint the credentials associated with the user account participating in the communication session and temporarily enables the client device endpoint to assume the privileges associated with the particular user account. In some implementations, the temporary use token may become invalid at a particular time or after a particular amount of time has lapsed after the token was created. Temporary use tokens may also be managed by the user account. For example, a user may log into a user account and delete or otherwise modify active temporary use tokens. After receiving the temporary use token at 750, the process proceeds to 760.

At 760, the transferee endpoint transmits a request to the communication session server to transfer the communication session from the transferor endpoint to the transferee endpoint. In some implementations, the request transmitted by the transferee endpoint at 760 includes the identifiers received from the transferor endpoint via the NFC connection at 700. The request may further include an identifier for the transferee endpoint. At 770, the transferee endpoint begins receiving audio, video, and data packets from the communication server. For example, the reflector 540 of the communication session coordinator 500 of the communication server 300 begins transmitting packets associated with the communication session to the transferee endpoint.

Figure 8:
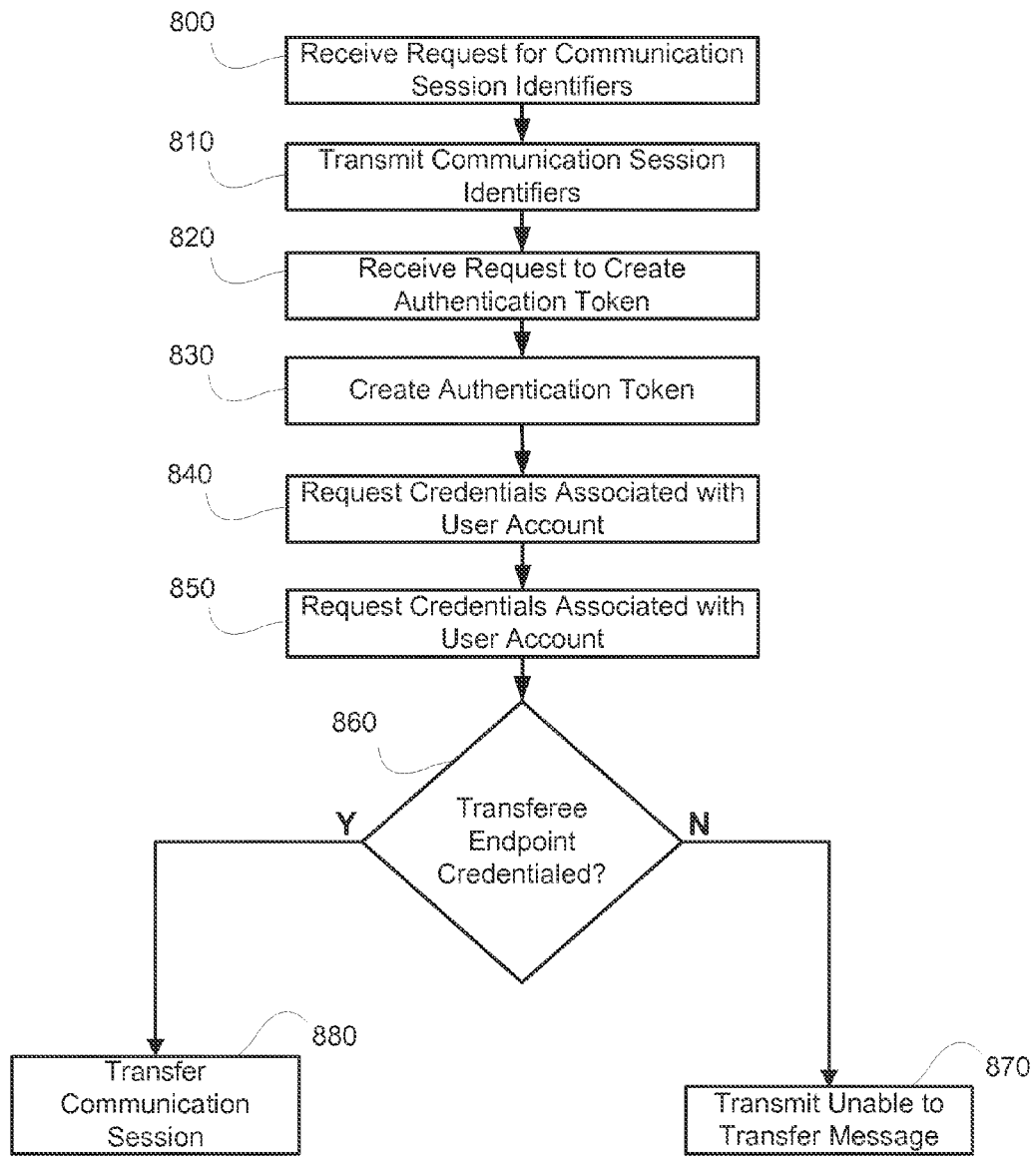
FIG. 8 is a flow chart depicting a method implemented at a communication session server for transferring a communication session from a first endpoint to a second endpoint, according to one aspect of the disclosure.

FIG. 8 is a flow chart depicting a method implemented at a communication session server for transferring a communication session from a first endpoint to a second endpoint, according to one aspect of the disclosure. At 800, the communication session server receives a request from a transferor endpoint for a communication session identifier data structure and a participant identifier data structure pertaining to the transferor endpoint. At 810, the communication session server transmits the communication session identifier data structures and communication session participant identifier data structures to the transferor endpoint.

At 820, the communication session server receives a request to create an authentication token that confers credentials associated with a user account with which the transferor endpoint is accessing the communication session. At 830, the communication session server creates the authentication token. In some implementations, the communication session server may query the user account in order to determine user account settings pertaining to the creation of authentication tokens. User account settings may specify that authentication tokens should have particular characteristics. In some implementations, the particular characteristics for authentication tokens specified by user accounts may differ depending on the identity of the transferor endpoint and the transferee endpoint. The characteristics of authentication tokens specified by a user account may include but are not limited to the time duration for which the authentication token remain valid, the number of devices that can use the temporary authentication token, and whether the authentication token may be reused or conditionally reused. For example, if an endpoint that gained access to a communication session through use of an authentication token has the connection to the communication session terminated due to a technical problem, authentication token characteristics may specify that the authentication token will remain valid for some period of time in order to allow the endpoint to reestablish the connection to the communication session.

At 840, the communication session server receives a request from the transferee endpoint to have the communication session transferred from the transferor endpoint to the transferee endpoint. The request transmitted by the transferee endpoint may include the communication session identifier data structure and the participant identifier data structure transmitted from the communication session server to the transferor endpoint at 800. The request transmitted from the transferee endpoint may further include an identifier for the transferee endpoint, and in some implementations, the request from the transferee endpoint may include a request to create a participant identifier data structure corresponding to the transferee endpoint. At 850, the communication session server requests credentials associated with a user account from the transferee endpoint. At 860, the communication session server determines whether the transferee endpoint has provided credentials associated with the user account. If the transferee endpoint has not provided credentials associated with the user account, the process proceeds to 870 where the communication session server transmits a message to the transferee endpoint that the communication session cannot be transferred. In some implementations, a similar transfer failed message may also be transmitted to the transferor endpoint. However, if the transferee endpoint has provided credentials associated with the user account, the process proceeds to 880 where the communication server ceases transmitting packets associated with the communication session to the transferor endpoint and begins transmitting packets associated with the communication session to the transferee endpoint. For example, at 880 the reflector 540 of the communication session coordinator 500 of the communication server 300 begins transmitting packets associated with the communication session to the transferee endpoint.

In the example embodiments, the various applications can be configured on any distributed or embedded platform within a single physical location or multiple locations. Similarly, some of the resources may reside on individual and separate platforms or they may be embedded into the server or other platforms. As such, embodiments contemplate that applications, resources, managers, servers, etc. may be joined or separated without diverging from their identities and functions. For example, a "server system" may include a single server platform or multiple server platforms.

All references, including publications, patent applications, and patents, cited herein are hereby incorporated by reference to the same extent as if each reference were individually and specifically indicated to be incorporated by reference and were set forth in its entirety herein.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to retrieve content (i.e., recorded voicemails) from a content server (i.e., a voicemail server). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as, for example, to a city, ZIP code, or state level), so that a particular location of a user cannot be determined. Thus, the user may have control over how information is collected about him or her and used by the systems discussed herein.

The use of the terms "a" and "an" and "the" and "at least one" and similar referents in the context of describing the disclosed subject matter (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate the disclosed subject matter and does not pose a limitation on the scope of the invention unless otherwise claimed. No language in the specification should be construed as indicating any non-claimed element as essential to the practice of the invention.

Variations of the embodiments disclosed herein may become apparent to those of ordinary skill in the art upon reading the foregoing description. Skilled artisans may employ such variations as appropriate, and the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method, executed by one or more processors at a transferee endpoint, for seamlessly transferring a communication session from a transferor endpoint via close-range communication connection, the method comprising:
receiving, by a transferee endpoint via a close-range communication connection, a request to confirm that the transferee endpoint is linked to a user account associated with a communication session;
sending, from the transferee endpoint to a transferor endpoint, a response to said request that the transferee endpoint is linked to the user account associated with the communication session;
receiving, by the transferee endpoint via the close-range communication connection, serialized communication session data from the transferor endpoint;
deserializing, at the transferee endpoint, the serialized communication session data received from the transferor endpoint;
transmitting, from the transferee endpoint to a communication session server, communication session identifiers and a request to continue the communication session on the transferee device;
receiving, at the transferee endpoint from the communication session server, a request to authenticate the user account associated with the communication session; and
transmitting, from the transferee endpoint to the communication session server, data necessary to authenticate the user account associated with the communication session.

2. The method of claim 1, wherein the transferee endpoint is not linked to the user account associated with the communication session; and
wherein the transmitting data necessary to authenticate the user account associated with the communication session comprises transmitting, from the transferee endpoint to the communication session server, an authentication token that temporarily confers credentials associated with the user account to the transferee endpoint.

3. The method of claim 2, wherein the authentication token comprises an expiration time and a past use history.

4. The method of claim 2, wherein the authentication token is created by the communication session server and transmitted to the transferee endpoint.

5. The method of claim 1, wherein the communication session identifiers comprise an endpoint identifier and a communication session identifier.

6. The method of claim 1, wherein the request to continue the communication session on the transferee device comprises a request to assume an identity of the transferee endpoint for a duration of the communication session.

7. The method of claim 2, wherein the authentication token expires upon termination of the communication session.

8. The method of claim 2, wherein transmission of the authentication token from the transferee endpoint to the transferee endpoint starts a countdown timer and if the authentication token is not used before the countdown timer reaches zero, the authentication token expires.

9. A method for seamlessly transferring a communication session from a transferor endpoint to a transferee endpoint via a close-range communication connection, the method comprising:
creating an identifier for a communication session and an identifier for a transferor endpoint;
transmitting the identifiers for the communication session and the transferor endpoint to the transferor endpoint;
receiving, from a transferee endpoint, the identifiers for the communication session and the transferor endpoint and a request to continue the communication session at the transferee endpoint;
determining by the transferor endpoint via a close-range communication connection that a user account associated with the communication session is linked to the transferee endpoint;
authenticating the user account on the transferee endpoint;
receiving, from the transferee endpoint, input into the communication session;
wherein the user account is associated with the communication session; and
wherein the transferee endpoint acquires the identifiers for the communication session and the transferor endpoint from the transferor endpoint via the close-range communication connection.

10. The method of claim 9, wherein the transferee endpoint is not linked to the user account associated with the communication session; and
wherein the receiving the identifiers for the communication session and the transferor endpoint and a request to continue the communication session at the transferee endpoint comprises receiving, from the transferee endpoint, an authentication token that temporarily confers credentials associated with the user account to the transferee endpoint.

11. The method of claim 10, wherein the authentication token comprises an expiration time and a past use history.

12. The method of claim 10, wherein the authentication token is created by the communication session server and transmitted to the transferor endpoint.

13. The method of claim 9, wherein the communication session identifiers comprise an endpoint identifier and a communication session identifier.

14. The method of claim 9, wherein the request to continue the communication session on the transferee device comprises a request to assume an identity of the transferor endpoint for a duration of the communication session.

15. The method of claim 10, wherein the authentication token expires upon termination of the communication session.

16. The method of claim 10, wherein transmission of the authentication token from the transferor endpoint to the transferee endpoint starts a countdown timer and if the authentication token is not used before the countdown timer reaches zero, the authentication token expires.

17. A system for seamlessly transferring a communication session from a transferor endpoint to a transferee endpoint via a close-range communication connection, the system comprising:
a transferor endpoint, comprising one or more processors and computer readable media, wherein the transferor endpoint is configured to determine, via a close range communication connection, that a transferee endpoint is linked to a user account associated with the communication session, to serialize communication session data and to transmit serialized communication session data to the transferee endpoint via the close range communication connection;
the transferee endpoint, comprising one or more processors and computer readable media, wherein the transferee endpoint is configured to receive serialized communication session data from the transferor endpoint via a close-range communication connection, to deserialize the serialized communication session data, to transmit communication session identifiers to a communication session server, to transmit a request to continue the communication session initiated on the transferor endpoint at the transferee endpoint, and to authenticate the user account associated with the communication session; and a communication session server, comprising one or more processors and computer readable media, wherein the communication session server is configured to create a communication session identifier and an endpoint identifier corresponding to the transferor endpoint, to transmit, to the transferor endpoint, the communication session identifier and the endpoint identifier corresponding to the transferor endpoint, to receive a request from the transferee endpoint to continue the communication session initiated at the transferor endpoint at the transferee endpoint, to perform an authentication procedure to verify that the transferee endpoint has permissions associated with a user account, to begin receiving communication session input from the transferee endpoint, and to terminate reception of communication session input from the transferor endpoint.

18. The system of claim 17, wherein the transferor endpoint is further configured to determine, via the close-range communication connection, that the transferee endpoint does not have the credentials associated with the user account associated with the communication session, to request an authentication token granting the credentials associated with the user account, to receive the authentication token, and to transmit the authentication token to the transferee endpoint via a close-range communication connection.

19. The system of claim 18, wherein the authentication token expires upon termination of the communication session.

20. The system of claim 18, wherein transmission of the authentication token from the transferor endpoint to the transferee endpoint starts a countdown timer and if the authentication token is not used before the countdown timer reaches zero, the authentication token expires.

* * * * *